Oct. 28, 1952 H. GROSS ET AL 2,615,621
CASH REGISTER
Filed Dec. 23, 1946 7 Sheets-Sheet 1
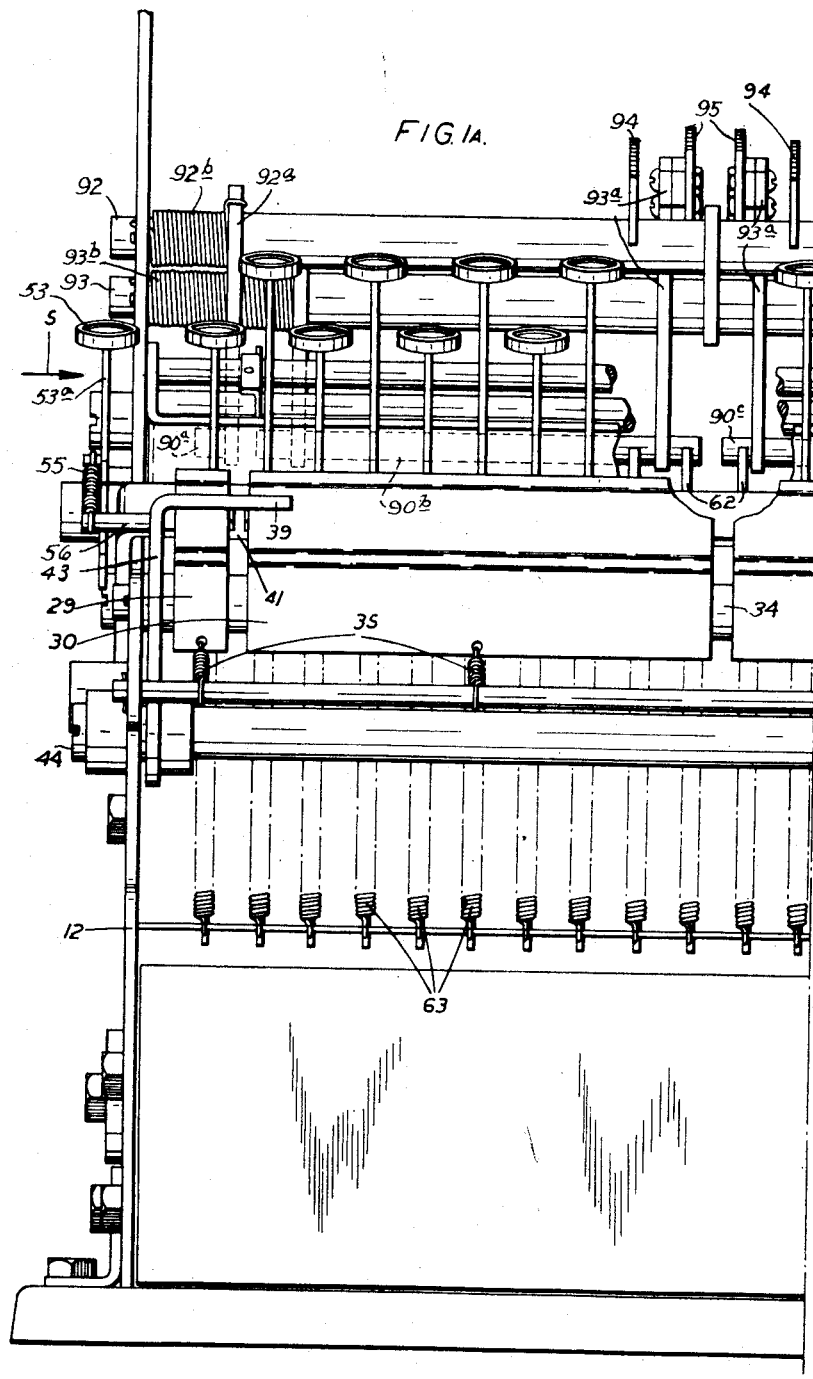
FIG. IA.
Inventors
HENRY GROSS & SAMUEL GROSS
By
Young, Emery & Thompson
Attorneys

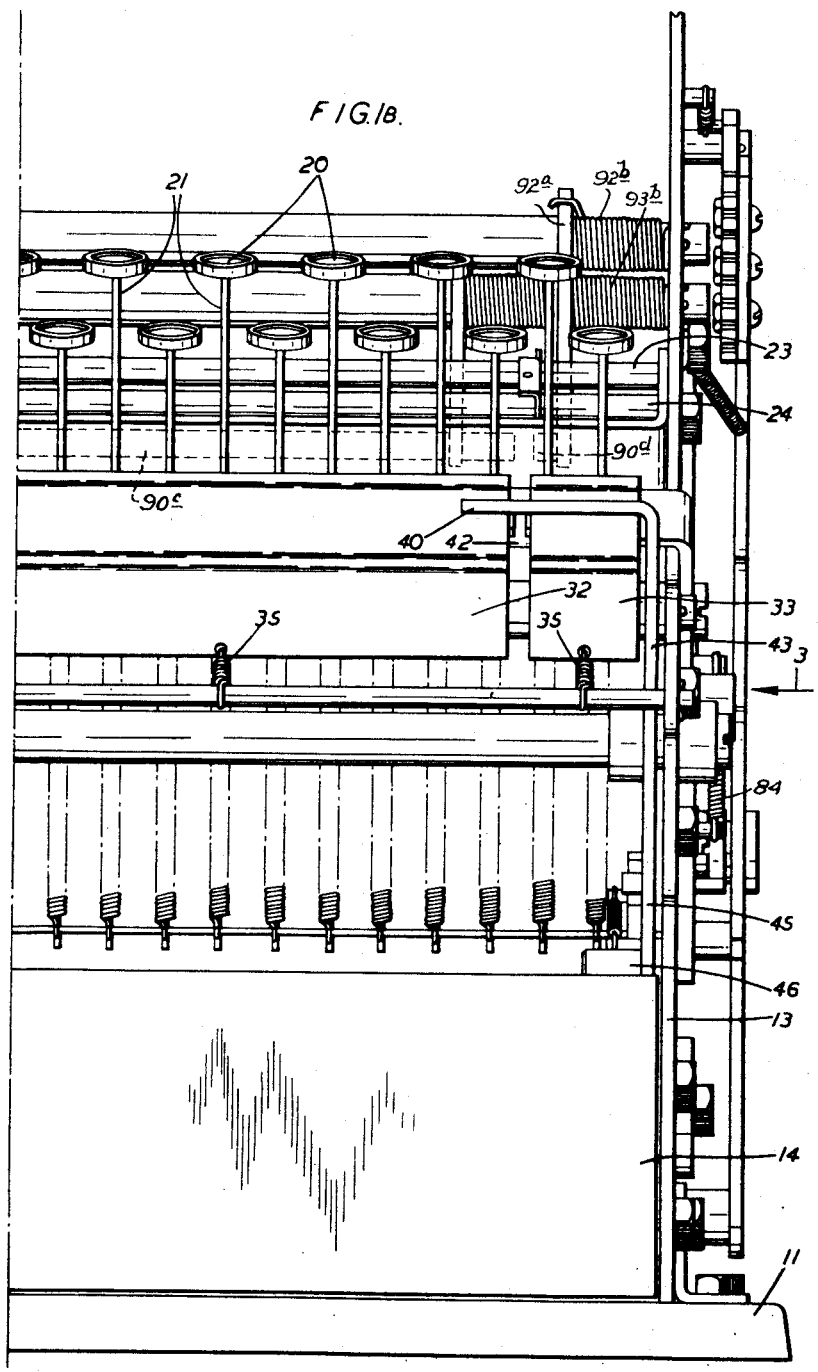

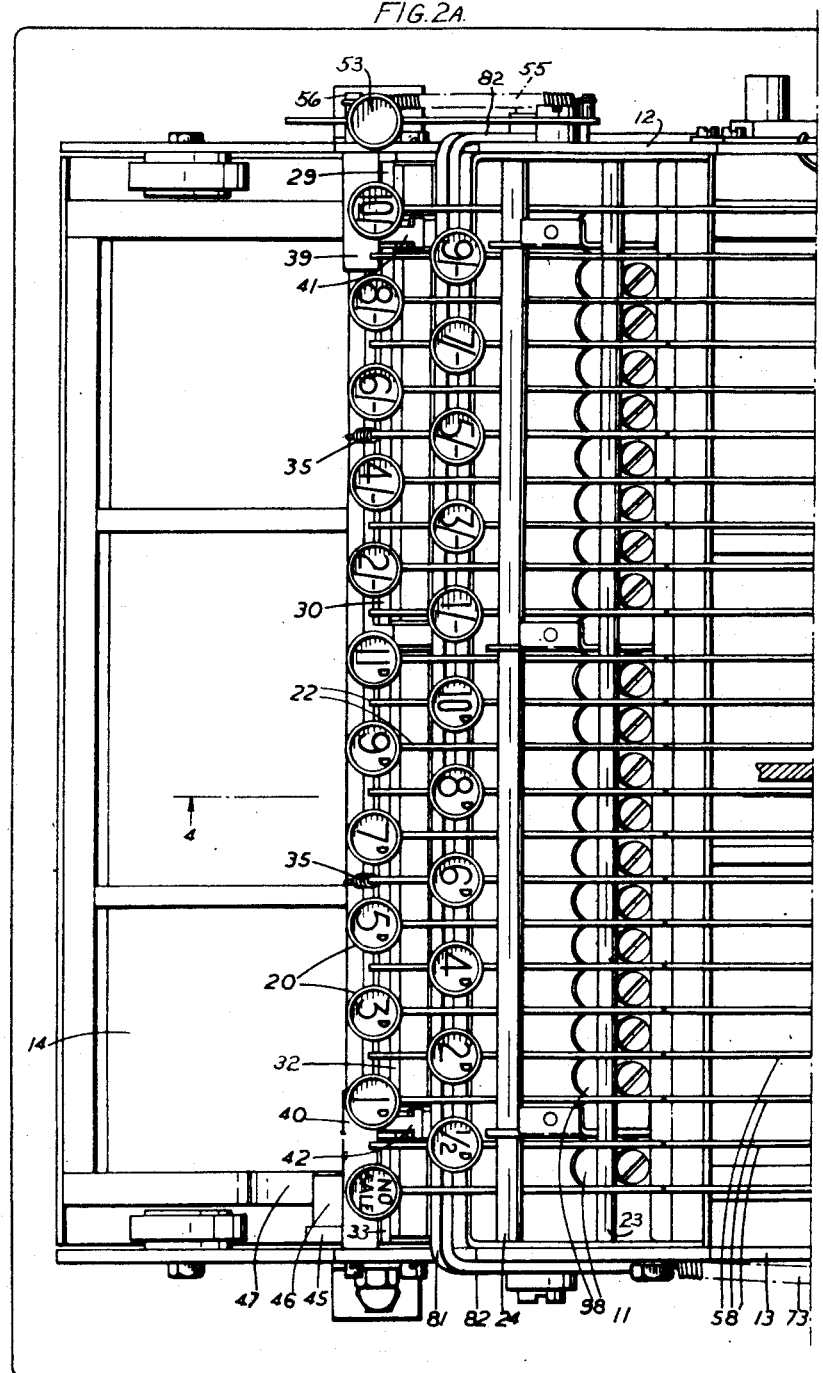

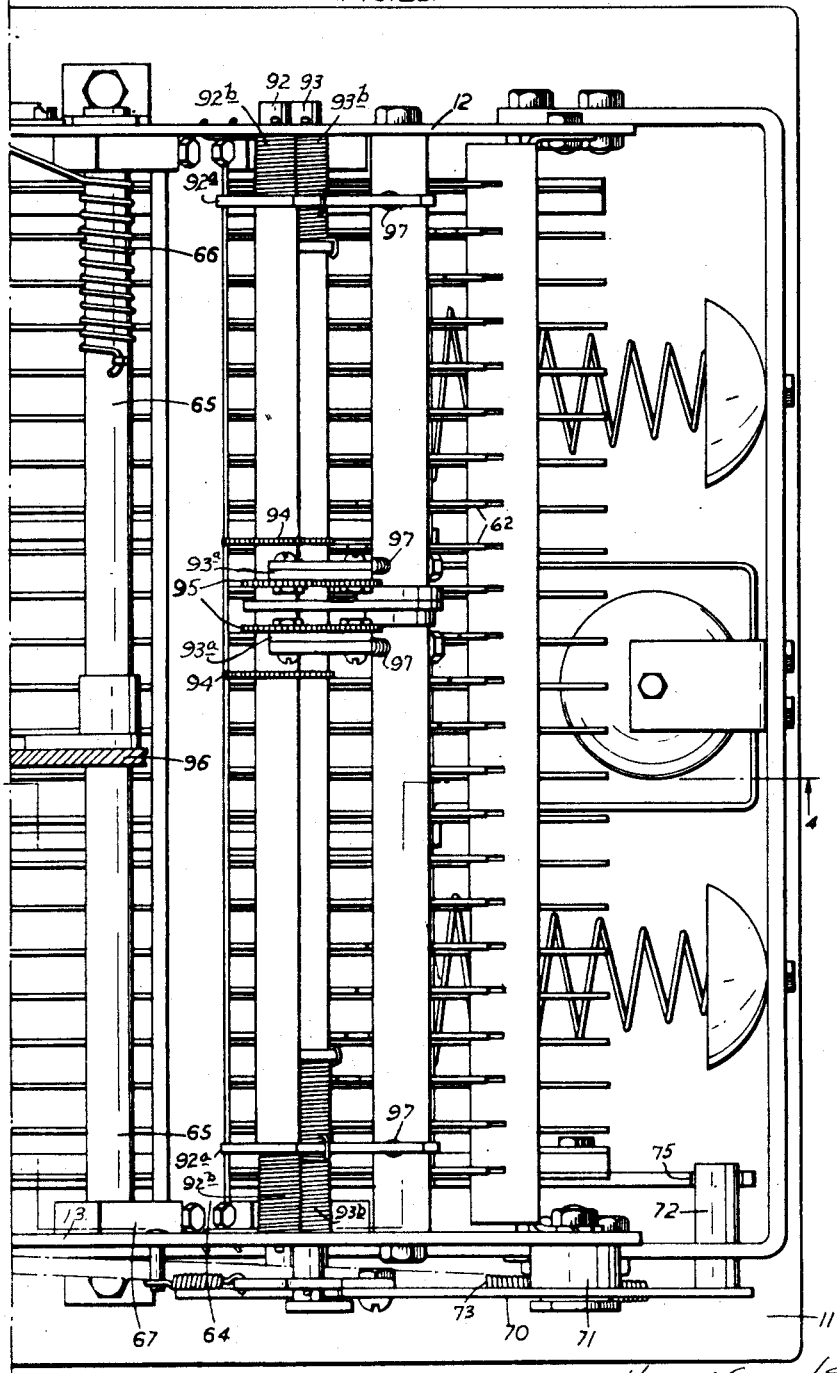

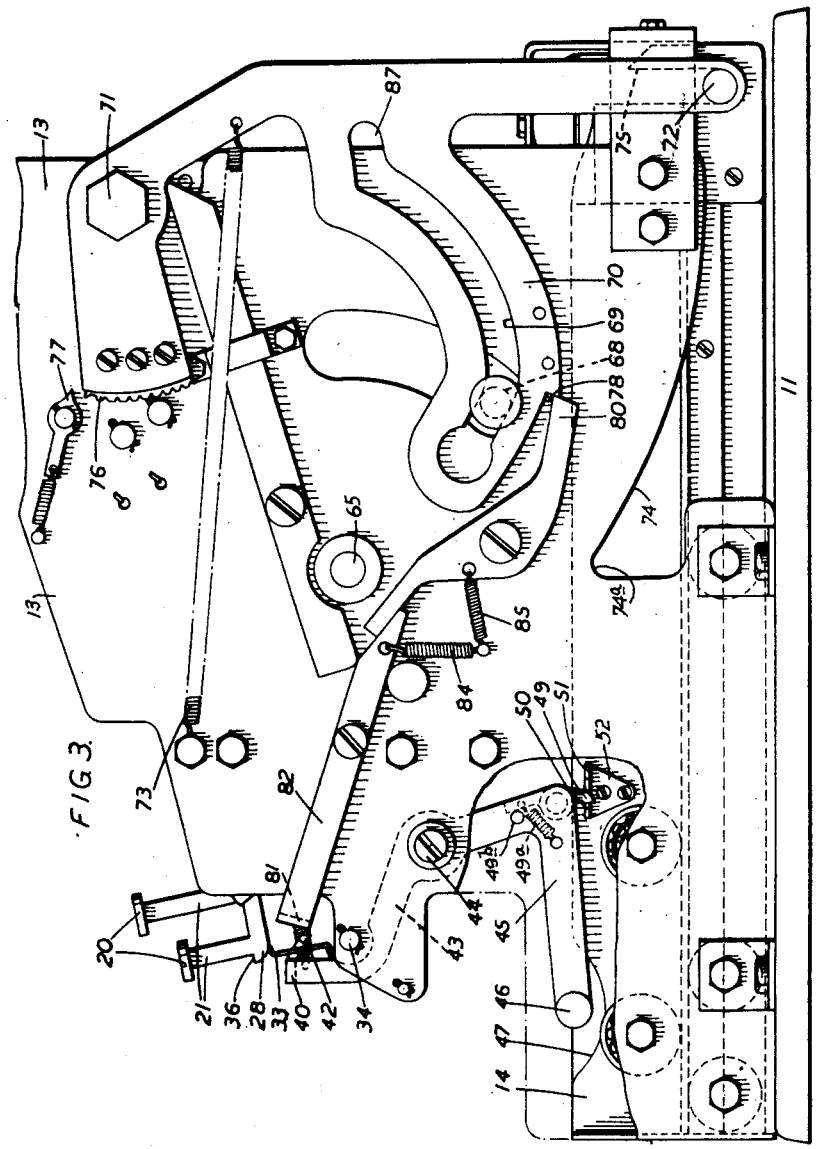

Oct. 28, 1952  H. GROSS ET AL  2,615,621
CASH REGISTER

Filed Dec. 23, 1946  7 Sheets-Sheet 6

Inventors
HENRY GROSS & SAMUEL GROSS
By
Young, Emery & Thompson
Attorneys

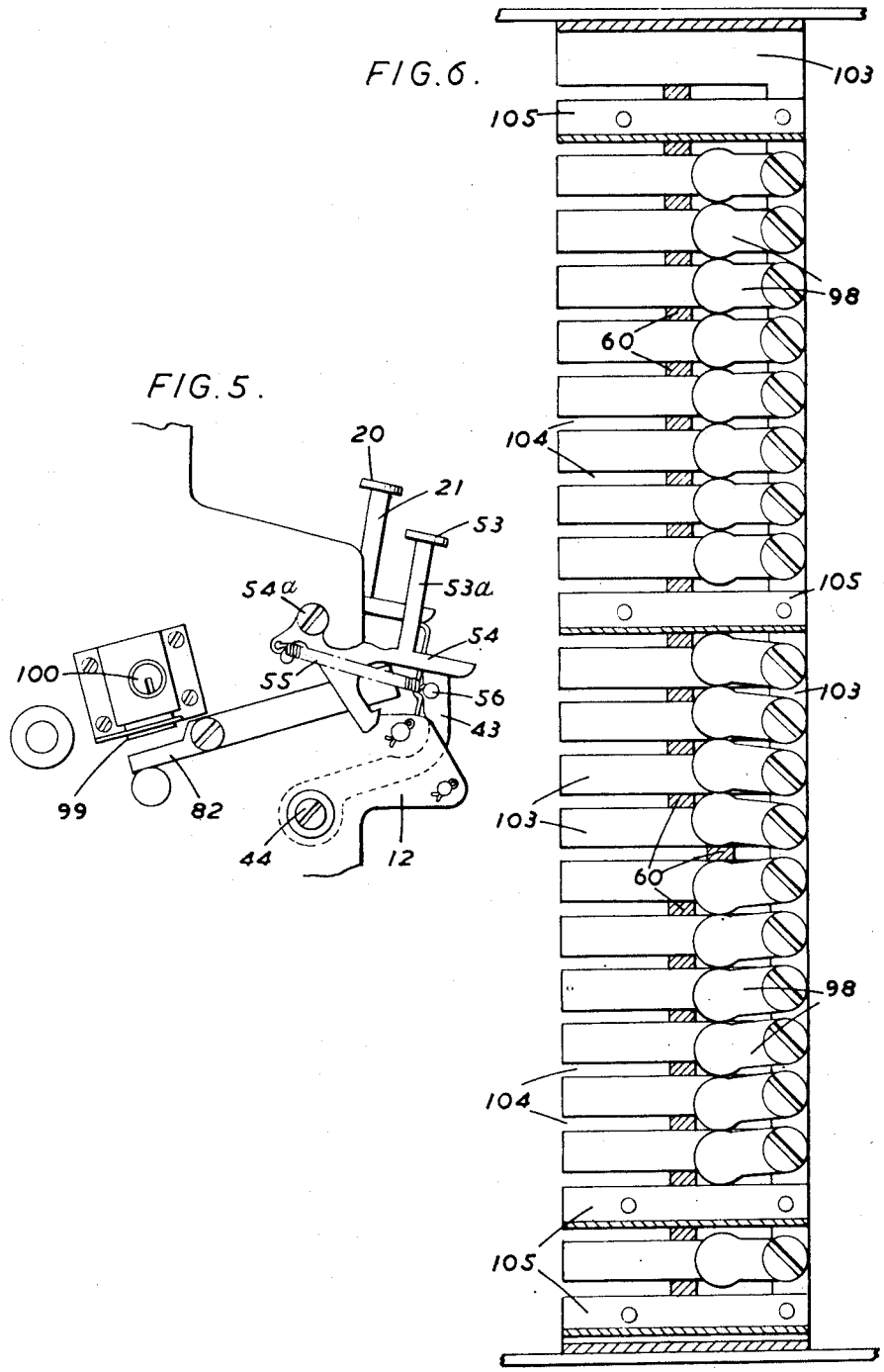

Patented Oct. 28, 1952

2,615,621

UNITED STATES PATENT OFFICE 2,615,621

CASH REGISTER

Henry Gross and Samuel Gross, East Finchley, London, England

Application December 23, 1946, Serial No. 717,912
In Great Britain January 1, 1946

13 Claims. (Cl. 235—10)

This invention relates to cash registers and other calculating machines.

Machines of this kind are commonly provided with a series of keys to be depressed by the operator and which are hereinafter termed actuating keys. These keys generally carry an indication of the sums of money or numbers or other quantities to be added or otherwise entered into the calculation to be made. Operation of these keys brings about differential movement of suitable elements such as toothed sectors the movements of which are applied to the adding or other calculating mechanism and at the same time operates indicator elements which indicate the items added.

Some cash registers have been provided in which the manual effort applied to the actuating keys is transferred to the adding or other calculating mechanism which not only involves waste of effort but also renders it possible to damage the machine by too vigorous operation.

In other cash registers also it has been known to provide a separate operating handle in addition to the actuating keys and operation of which effects the adding and at the same time releases the usual till, or this handle can be replaced by a button which completes a motor switch whereupon the motor effects the adding and releases the till.

According to one feature of the present invention a source of power is provided for effecting the adding or other calculating operation and the operation of the actuating keys controls means for enabling the aforesaid source of power to come into operation. In a preferred arrangement one or more springs is held under tension or compression and provides the aforesaid source of power, and can come into operation only when a trip device is operated by depression of an actuating key.

A further feature of the invention consists in providing means for holding each of the actuating keys in a position intermediate its normal and depressed positions for the purpose of "pre-setting" so that an operator can set for example a shillings key and a pence key whereupon operation of the halfpenny key will bring about the addition of all three amounts. The operator can use this pre-setting if he so desires but can depress the keys to the full extent at once if he prefers. In a preferred arrangement an adding device or totaliser is asssociated with a series of adding levers which are movable for effecting adding by power supplied by spring means and each lever is controlled by a trip connected to the associated actuating key.

The invention will now be described by way of example with reference to the accompanying diagrammatic drawings wherein:

Figures 1A and 1B jointly show in front elevation a cash register made in accordance with the invention;

Figures 2A and 2B jointly show a plan view thereof;

Figure 3 is a side elevation thereof in the direction of the arrow 3 on Figure 1B;

Figure 5 is an elevational view of certain parts in the direction of the arrow 5 on Figure 1; and Figure 6 illustrates a detail.

Figure 4:
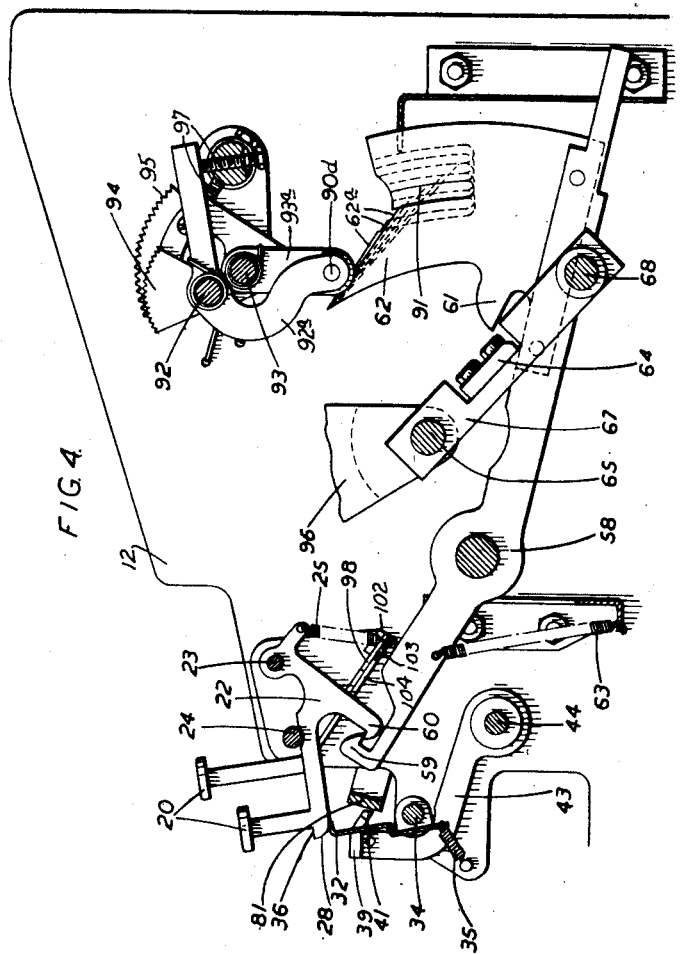
Figure 4 is a sectional view on the line 4—4 on Figure 2B showing only certain parts.

The machine has a base 11 that carries side frame plates 12, 13, in which the various parts are mounted, a till drawer 14, and the actuating keys 20.

The actuating keys 20 in this particular example consist of the following: 10, 9, 8, 7, 6, 5, 4, 3, 2, 1 shilling keys, 11, 10, 9, 8, 7, 6, 5, 4, 3, 2, 1 penny keys, one halfpenny key and one "no sale" key, arranged in two rows by staggered arrangement of key stems therefor 21. These key stems are mounted on a series of twenty-three actuating trip levers 22 that are pivoted on a common shaft 23 disposed transversely of the machine and urged towards their normal positions, that is to say with the actuating keys in their uppermost positions against a stop bar 24, by an equivalent number of springs 25. These trip levers have their front ends curved or cam shaped underneath as shown at 28. These trip levers are associated with pre-setting pawls comprising one pawl 29 for the 10/-key, a second pawl 30 which is long enough to serve all of the other shilling keys (comprising a "bank" of keys), a third pawl 32 which serves all of the penny keys (comprising another "bank" of keys), and a fourth pawl 33 which serves the halfpenny and "no sale" keys in a separate bank of two keys. These pawls are mounted on a common fixed shaft 34 located transversely of the machine and are spring pressed into contact with the curved parts of the trip levers by springs 35. As a key is depressed the curved or cam shaped part pushes the associated pawl forwardly until a projection 36 at the front end of the key is beneath the pawl whereupon the latter is returned to its normal position so as to hold the depressed key down in its pre-set position. Located in front of these pawls are two short horizontal bars 39, 40 each of which carries a rearwardly extending T shaped member 41, 42 respectively, the former of which engages the two shilling pawls 29, 30 and the other of which engages the other two pawls 32, 33. These bars are mounted on arms 43 that are carried by a shaft 44 associated with a bell crank lever 45 carrying a pin 46 that is located in a depression 47 on the top front to rear edge of the adjacent side of the till when the latter is closed. The lever 45 carries a pawl 49 which is urged in a counter-clockwise direction as seen in Figure 3 by a spring 49a, this movement of the pawl being limited by a stop 49b. The pawl 49 is adapted to co-operate with two abutments 50, 51 which project from a bracket 52 secured to one side wall of the till drawer 14 and are spaced a suitable distance apart from front to rear of the machine. An error release key 53 (Figure 5) is mounted on a key stem 53a integral with a lever 54 which is pivoted on a stud 54a projecting from the side frame plate 12. The key 53 is adapted on depression to engage a pin 56 on one of the arms 43 so as to rock said arms in a counter-clockwise direction as seen in Figures 3 and 4, whereupon the T-shaped members 41, 42 pull the pre-setting pawls forwards to release the actuating keys from their pre-set positions. A tension spring 55 connected to the pin 56 urges the arms 43 in a direction to engage the bars 39, 40 against the pawls.

A series of twenty-three adding levers 58 (Figure 4) are mounted on a common shaft located transversely of the machine and have their front ends hooked as at 59, and the hooks are engaged by fingers 60 on the trip levers. Each adding lever also has an upstanding rear hook 61 and at its rear end carries an upstanding adding cam 62. The front ends of the adding levers are urged downwardly by a series of springs 63, one for each lever. Located across the levers adjacent to their rear hooks is a coupler bar 64 which is mounted on an adjacent transverse coupler shaft 65 associated with a strong spring 66 (Figure 2B) which tends to urge the shaft about its axis in the direction to raise the coupler bar. The coupler bar is carried by rearwardly projecting arms 67 one of which carries a roller 68 engaged by a cam track 69 (Figure 3) which is formed in a cam track lever 70 which is pivoted to the frame of the machine at its upper end at 71 and carries a pin 72 at its lower end that engages a slot 65 in the rear of the till. A strong spring 73 tends to rock the cam track lever forwardly and the cam track is shaped so that during such movement the coupler bar is raised. The slot 75 in the till is open at its upper end so that the till can be fully withdrawn when open. The side frame plate 13 is formed with a curved surface 74 concentric with the pivotal axis 71 along which the pin 72 runs during the opening and closing movements of the drawer. The cam track lever also carries a toothed segment 76 engaged by a spring pressed pawl 77 to prevent the till from being pushed inwards until it has completed the required stroke, and to prevent the till from being pulled out if it is not pushed quite home. The cam track lever has an abutment 78 which is engaged in its normal position by a side trip lever 80. A trip bar 81 is disposed across the front of the machine beneath the trip levers 22 and has its ends 82 bent at right-angles to the bar and these ends are pivoted to the side frame members of the machnie. One of these ends extends into engagement with the side trip lever. Springs 84, 85, tend to move the parts 80, 81, 82, to their normal positions. The cam track has a portion 87 at one end concentric with its pivot axis so that it has some degree of movement in which no movement is applied to the coupler bar.

The upstanding adding cams 62 are adapted to actuate four axially aligned adding rods 90a, 90b, 90c and 90d (Figures 1A, 1B and 4) of an adding mechanism, the rod 90a corresponding to the 10/- key, the rod 90b to the bank of other shillings keys, the rod 90c to the pence keys and the rod 90d to the ½d. key. The cams associated with the bank of 1 to 9 shillings keys have cam faces 62a of different lengths according to the key value and also have lost motion portions 91 concentric with the common axis of the adding levers 58 which enable the adding mechanism to remain stationary while said adding levers are completing their movements, thereby preventing risk of over-run of said mechanism by momentum. The cams associated with the bank of pence keys similarly have cam faces 62a of different lengths and lost motion portions 91. Lost motion portions 91 are also formed in the single 10/- and ½d. cams. The lever 58 associated with the "no sale" key does not carry an adding cam but has a separate connection with a "no sale" counter. The rods 90a and 90d are carried by arms 92a which in turn are carried by sleeves surrounding a shaft 92 mounted in the side frame plates 12, 13 and said arms each carry a toothed segment 94 adapted to actuate the corresponding elements of a suitable adding unit or totalizer unit (not shown). The rods 90b and 90c are similarly carried by arms 93a which in turn are carried by sleeves surrounding a shaft 93 parallel to the shaft 92 and also mounted in the side frame plates 12, 13, said arms each carrying a toothed segment 95 adapted to actuate the corresponding elements of said adding unit. The segments 94, 95 are rocked through distances corresponding to the length of the cam faces 62a associated with the respective keys of each bank, and are urged rearwardly, i. e., in a clockwise direction as seen in Figure 4, by springs 92b, 93b respectively coiled about the corresponding sleeves. Stops 97 are provided for limiting this rearward movement of the segments.

The coupler shaft 65 may carry parts for imparting other movements to the adding unit e. g. a segment 96 and suitable "transfer" cams.

For preventing the operation of two keys in each of the 1 to 9 shillings bank, the pence bank or the ½d. and "no sale" bank for any single transaction, there are provided three series of stop levers 98 (Figures 2A, 4 and 6), one for each bank. These levers are pivotally mounted on studs 102 carried by a plate 103 extending across the machine between the side frame plates and are arranged in a single row, there being one lever 98 between each two adjacent trip levers 22 of each bank. The plate 103 is slotted at 104 to receive the fingers 60 of the trip levers and the endmost stop levers in each of the shilling and pence series and the single stop lever between the no sale and ½d. trip levers, are permitted only limited pivotal movement by means of fixed parts 105 on the plate 103. For the shillings and pence banks the finger 60 of a trip lever 22 must pass between two adjacent stop levers 98 (or between one of the fixed parts 105 and the adjacent stop lever 98) in order to actuate the trip bar 81, and the stop levers are laterally so dimensioned at their free ends that when one trip lever of a bank has been thus actuated, all the movable stop levers in the corresponding series are rocked and obstruct the remaining slots 104, whereafter no other trip lever in that bank can be operated until the machine has been actuated or the error release key depressed. The stop lever between the ½d. and "no sale" trip levers is movable in opposite directions according to which of these two trip levers is actuated and in either position obstructs the other slot 104. The series of stop levers 98 may be replaced by series of balls.

There is no interlocking between the "No Sale" key and any of the amount keys other than the ½ penny key. No such interlocking is, in fact, necessary since the pence and shillings keys are adequately spaced from the "No Sale" key and it is only the proximity of the "No Sale" key to the ½ penny key that makes it desirable for these two keys to be arranged in a single bank with an interlocking arrangement.

The operation of the machine will now be described.

When the machine is in its normal or inoperative condition, the parts are in the positions shown in Figures 1 to 5. The abutment 50 is thus engaged by the pawl 49 to hold the bars 39, 40 sufficiently spaced from the pre-setting pawls to enable said pawls to ride over the curved front ends 28 of the trip levers when the latter are actuated. If the machine is to be pre-set, the amount keys 20 corresponding to the value of the transaction to be entered in the adding unit are depressed, as previously described, until they become locked against return movement by the engagement of the corresponding pre-setting pawls with the projections 36. The keys 20 may be pre-set either simultaneously or separately. During this movement of the keys 20 the fingers 60 of said keys disengage from the hooked front ends 59 of the associated adding levers 58. If an incorrect amount key should have been pre-set the operator can return all the pre-set keys to their normal positions by actuating the error release key 53. The stop levers 98 are operative in the pre-set position of any key 20.

After pre-setting the required keys, the operator further depresses any one of said keys (which may be the last pre-set key) and the associated trip lever 22 engages the trip bar 81 rocking it downwardly and releasing the abutment 78 on the cam track lever 70 from the side trip lever 80. The cam track lever is now rocked clockwise by the spring 73, the roller 68 causing the coupler bar 64 to move upwardly, this movement of the coupler bar being assisted by the spring 66. At the same time the springs 63 of the released adding levers 58 rock said levers in a counter-clockwise direction so that the hooks 61 of said levers become located in the path of movement of the coupler bar. The coupler bar thereupon picks up the said released adding levers by engaging their hooks 61 so that all said levers are rocked simultaneously to actuate the adding unit. Simultaneously with the raising of the coupler bar the till drawer commences to move out by the engagement of the pin 72 within the drawer slot 75, and during this movement of the drawer the pawl 49 is engaged by the abutment 51 and rocked idly against the action of its spring. The pin 46 leaves the recess 47 and rides along the upper edge of said drawer, thereby holding the bars 39, 40 against the pre-setting pawls so that no other key 20 can then be depressed.

Once the side trip lever 80 has disengaged from the abutment 78 on the cam track lever 70, full actuation of said lever is effected by the spring 73, with the result that the coupler bar 64 and the released adding levers 58, assisted by the spring 66, are also rocked to their fully operative positions and transmit the appropriate movements to the adding unit. This actuation of the cam track lever also effects opening of the till drawer and during this opening movement the pin 72 rides along the curved surface 74 of the side frame plate 13. After the pin 72 disengages from the slot 75 in the till drawer it is arrested by the part 74a of the surface 74, thus also stopping the cam track lever. When thereafter the drawer is moved manually inwardly towards its closed position, pin 72 re-engages with the slot 75 and returns the cam track lever to its normal position. The coupler bar 64 and subsequently the side trip lever 80 and trip bar 81 are also returned to their normal positions. The pawl 49 is engaged by the abutment 51 on the till drawer and rocks lever 45 to disengage bars 39, 40 from the pre-setting pawls, and these pawls are then engaged by the T-shaped members 42 carried by said bars and pulled away from the projections 36 on the actuated trip levers. These trip levers are then returned to their normal position by the springs 25. During the last part of the closing movement of the till drawer the pawl 49 rides over the abutment 51 and engages the abutment 50, thus enabling the spring 55 to return the arms 43 to the position shown in Figure 3, whereupon the springs 35 also return the pre-setting pawls to the position shown in said figure.

From the foregoing detailed description it will be evident that the spring 73, assisted by the springs 63 and 66, provides a source of mechanical power which is available, when the keys are in their normal positions, to operate the adding levers 58 corresponding to the actuated amount keys 20, said springs being re-tensioned as the till drawer, which opens automatically during the operative movement of said adding levers, is manually returned to the closed position.

A plunger 99 is provided which when depressed by operating a key in a lock 100 locks the machine by engaging one of the arms 82 to prevent the drawer from being opened until it is released by means of a key.

It will further be appreciated that the machine may be designed to operate for the dollar system, or other currency instead of sterling.

We claim:

1. In a calculating machine, a calculating mechanism, a series of actuating keys, a series of cam levers, one for each key, arranged front to rear of the machine and operable to actuate the calculating mechanism according to which keys are operated, a coupler device, a powered member connected to said coupler, power means for actuating said powered member, spring means urging said cam levers towards positions in which they can be engaged with said coupler during its actuation, means engageable with the cam levers to retain said levers against movement under the action of said springs when the actuating keys are in their normal positions and operable to release said levers on partial actuation of the corresponding keys, means for holding said powered member inoperative until a partially actuated key has been further actuated and thereby permit said coupler to move the released cam levers in a direction to actuate the calculating mechanism, and means operable to restore said released cam levers to their normal positions against the action of said spring means.

2. In a calculating machine, a calculating mechanism, a series of actuating keys, a series of cam levers, one for each key, arranged front to rear of the machine and operable to actuate the calculating mechanism according to which keys are operated, a coupler device, a powered member connected to said coupler, power means for actuating said powered member, spring means urging said cam levers towards positions in which they can be engaged with said coupler during its actuation, means engageable with the cam levers to retain said levers against movement under the action of said springs when the actuating keys are in their normal positions and operable to release said levers on actuation of the corresponding keys to positions intermediate their normal and fully actuated positions for the purpose of "pre-setting," means for holding each said actuated key against return from its intermediate to its normal position, means for holding said powered member inoperative until one of said actuated keys has been moved beyond its intermediate position and thereby permit said coupler to move the released cam levers in a direction to actuate the calculating mechanism, and means operable to restore said released cam levers to their normal positions against the action of said spring means.

3. In a calculating machine, a calculating mechanism, a series of actuating keys, a series of cam levers, one for each key, arranged front to rear of the machine and operable to actuate the calculating mechanism according to which keys are operated, a coupler device, a powered member connected to said coupler, power means for actuating said powered member, spring means urging said cam levers towards positions in which they can be engaged with sad coupler during its actuation, a trip carried by each key and engageable with the cam levers to retain said levers against movement under the action of said springs when the actuating keys are in their normal positions and movable to release said levers on partial actuation of the corresponding keys, means for holding said powered member inoperative until a partially actuated key has been further actuated and thereby permit said coupler to move the released cam levers in a direction to actuate the calculating mechanism, and means operable to restore said released cam levers to their normal positions against the action of said spring means.

4. In a calculating machine, a calculating mechanism, a series of actuating keys, a series of cam levers, one for each key, arranged front to rear of the machine and operable to actuate the calculating mechanism according to which keys are operated, a coupler device, a powered member connected to said coupler, spring means for actuating said powered member, other spring means urging said cam levers towards positions in which they can be engaged with said coupler during its actuation, means engageable with the cam levers to retain said levers against movement under the action of said other spring means when the actuating keys are in their normal positions and operable to release said levers on partial actuation of the corresponding keys, means for holding said powered member inoperative until a partially actuated key has been further actuated and thereby permit said coupler to move the released cam levers in a direction to actuate the calculating mechanism, and a till drawer having connections with said powered member whereby the drawer is opened upon actuation of said member and whereby, on moving the drawer to its closed position, the spring means for actuating said powered member is tensioned and the actuated cam levers are restored to their normal positions against the action of said other spring means.

5. In a calculating machine, a calculating mechanism, a series of actuating keys, a series of cam levers, one for each key, arranged front to rear of the machine and operable to actuate the calculating mechanism according to which keys are operated, a coupler device, a powered member connected to said coupler, power means for actuating said powered member, spring means urging said cam lever towards positions in which they can be engaged with said coupler during its actuation, means engageable with the cam levers to retain said levers against movement under the action of said springs when the actuating keys are in their normal positions and operable to release said levers on actuation of the corresponding keys to positions intermediate their normal and fully actuated positions for the purpose of "pre-setting," a series of spring-pressed pivoted presetting pawls disposed across the machine in front of the keys and operable by cam shaped parts carried by said keys so as to move over projections carried by the keys to hold the actuated keys in the pre-set positions, means for holding said powered member inoperative until one of said actuated keys has been moved beyond its pre-set position and thereby permit said coupler to move the released cam levers in a direction to actuate the calculating mechanism, and means operable to restore said released cam levers to their normal positions against the action of said spring means.

6. In a calculating machine, a calculating mechanism, a series of actuating keys, a series of cam levers, one for each key, arranged front to rear of the machine and operable to actuate the calculating mechanism according to which keys are operated, a pivotally mounted coupler device, a lever having a cam track engaging a roller connected with said coupler, spring means for actuating said lever, other spring means urging said cam levers towards positions in which they can be engaged with the coupler during its actuation, means engageable with the cam levers to retain said levers against movement under the action of said other spring means when the actuating keys are in their normal positions and operable to release said levers on partial actuation of the corresponding keys, a trip device normally engaging an abutment on said cam track lever to hold the latter inoperative until a partially actuated key has been further actuated and thereby permit said coupler to move the released cam levers in a direction to actuate the calculating mechanism, a till drawer having a slot engaged by a projection on said cam track lever whereby the drawer is opened upon actuation of said lever and whereby on moving the drawer to its closed position, the spring means for actuating said cam track lever is tensioned and the actuated cam levers are restored to their normal positions against the action of said other spring means.

7. A machine as claimed in claim 5, comprising at least one lever having thereon a bar extending across the front of the pre-setting pawls, a T-shaped projection on said bar located behind said pre-setting pawls, a till drawer, means connecting said drawer to the powered member whereby the drawer is moved towards its open position by the actuation of said powered member, an abutment on said drawer, and a projection on said lever engageable with said abutment when the drawer is being manually moved from its open to its closed position thereby to rock said lever and cause the projection on the bar to move the pre-setting pawls to a position to free the actuated keys.

8. A machine as claimed in claim 5, comprising at least one lever having thereon a bar extending across the front of the pre-setting pawls, a till drawer, means connecting said drawer to the powered member whereby the drawer is moved towards its open position by the actuation of said powered member, and a pin on said lever engageable with a wall of said drawer so as thereby to press said bar against the pre-setting pawls and prevent actuation of any other keys while the drawer is open.

9. A machine as claimed in claim 5, comprising at least one lever having thereon a bar extending across the front of the pre-setting pawls, a T-shaped projection on said bar located behind said pre-setting pawls, a till drawer, means connecting said drawer to the powered member whereby the drawer is moved towards its open position by the actuation of said powered member, a pin on said lever engageable with a wall of said drawer so as thereby to press said bar against the pre-setting pawls and prevent actuation of any other keys while the drawer is open, an abutment on said drawer, a projection on said lever engageable with said abutment when the drawer is being manually moved from its open position to its closed position thereby to rock said lever and cause the projection on the bar to engage the pre-setting pawls, and a depression in the said drawer wall into which the said pin enters as the drawer reaches its closed position so as to permit the projection on the bar to move the pre-setting pawls to a position to free the actuated keys.

10. A machine as claimed in claim 5, comprising at least one lever having thereon a bar extending across the front of the pre-setting pawls, a T-shaped projection on said bar located behind said pre-setting pawls, a till drawer, means connecting said drawer to the powered member whereby the drawer is moved towards its open position by the actuation of said powered member, a pin on said lever engageable with a wall of said drawer so as thereby to press said bar against the pre-setting pawls and prevent actuation of any other keys while the drawer is open, a first abutment on said drawer, a spring-pressed pawl on said lever engageable with said abutment when the drawer is being manually moved from its open position to its closed position thereby to rock said lever and cause the projection on the bar to engage the pre-setting pawls, a depression in the said drawer wall into which the said pin enters as the drawer reaches its closed position so as to permit the projection on the bar to move the pre-setting pawls to a position to free the actuated keys, and a second abutment on said drawer with which the said spring-pressed pawl engages in the normal condition of the machine to hold the bar away from the pre-setting pawls.

11. A machine as claimed in claim 5, comprising at least one lever having thereon a bar extending across the front of the pre-setting pawls, a T-shaped projection on said bar located behind said pre-setting pawls, a till drawer, means connecting said drawer to the powered member whereby the drawer is moved towards its open position by the actuation of said powered member, an abutment on said drawer, a projection on said lever engageable with said abutment when the drawer is being manually moved from its open to its closed position thereby to rock said lever and cause the projection on the bar to move the presetting pawls to a position to free the actuated keys, and a release key having a key level actuable to move said bar so as to pull out the pre-setting pawls and release the pre-set keys.

12. A machine as claimed in claim 6, wherein said trip device comprises a trip bar disposed across the front of the machine and operable by further actuation of a partially actuated key, a trip lever normally in engagement with the abutment on the cam track lever, and a rearward projection on one end of said trip bar which cooperates with the trip lever so as to disengage said lever from the said abutment upon actuation of said trip bar.

13. A machine as claimed in claim 6, comprising a toothed segment on the cam track lever, and a spring-pressed pawl engageable with said toothed segment to prevent the till drawer from being pushed inwards until it has completed the required opening movement, and to prevent the drawer from opening if it has not been moved completely to its closed position.

HENRY GROSS.
SAMUEL GROSS.

REFERENCES CITED

The following references are of record in the file of this patent:

UNITED STATES PATENTS

| Number | Name | Date |
|---|---|---|
| 1,137,061 | Kettering et al. | Apr. 27, 1915 |
| 1,699,060 | Fuller | Jan. 15, 1929 |
| 1,742,524 | Gubelmann | Jan. 7, 1930 |
| 2,165,248 | Fuller | July 11, 1939 |
| 2,236,640 | Hanson | Apr. 1, 1941 |